United States Patent
Alicherry et al.

(10) Patent No.: US 7,609,624 B2
(45) Date of Patent: Oct. 27, 2009

(54) METHOD AND APPARATUS FOR PRE-PROVISIONING NETWORKS TO SUPPORT FAST RESTORATION WITH MINIMUM OVERBUILD

(75) Inventors: Mansoor Ali Khan Alicherry, Scotch Plains, NJ (US); Randeep Singh Bhatia, Somerset, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 688 days.

(21) Appl. No.: 10/838,098

(22) Filed: May 3, 2004

(65) Prior Publication Data

US 2005/0243711 A1 Nov. 3, 2005

(51) Int. Cl.
- *G01R 31/08* (2006.01)
- *G06F 11/00* (2006.01)
- *G08C 15/00* (2006.01)
- *H04J 1/16* (2006.01)
- *H04J 3/14* (2006.01)
- *H04L 1/00* (2006.01)
- *H04L 12/26* (2006.01)

(52) U.S. Cl. ............................ 370/228; 370/256
(58) Field of Classification Search ............ 370/216, 370/222, 228, 254–258; 709/239
See application file for complete search history.

(56) References Cited

U.S. PATENT DOCUMENTS

| | | | | |
|---|---|---|---|---|
| 5,734,640 A | * | 3/1998 | Johnson | 370/228 |
| 6,047,331 A | * | 4/2000 | Medard et al. | 709/239 |
| 6,105,018 A | * | 8/2000 | Demers et al. | 707/2 |
| 6,885,822 B1 | * | 4/2005 | Chin et al. | 398/59 |
| 7,133,359 B2 | * | 11/2006 | Weis | 370/222 |
| 2003/0101302 A1 | * | 5/2003 | Brocco et al. | 710/300 |

* cited by examiner

*Primary Examiner*—Seema S Rao
*Assistant Examiner*—Leon Andrews
(74) *Attorney, Agent, or Firm*—Ryan, Mason & Lewis, LLP

(57) ABSTRACT

Improved network design techniques are provided. For example, a technique for designing a protection capacity to be reserved in a network comprises the following steps/operations. One or more link capacities associated with a network topology are obtained. The network is assumed to have no pre-existing working traffic. A capacity partition including a working capacity portion and a protection capacity portion is determined for at least one link in the network topology. The protection capacity portion is reserved for rerouting working traffic upon a failure and enabling control over the number of backup tunnels, associated with the at least one link, on which working traffic can be rerouted. Determining the capacity partition substantially guarantees at least one of a minimal failure restoration time and a minimal overbuild. A minimal overbuild may include an overbuild equivalent to no more than two times an overbuild required for an optimal solution.

23 Claims, 8 Drawing Sheets

FIG. 1

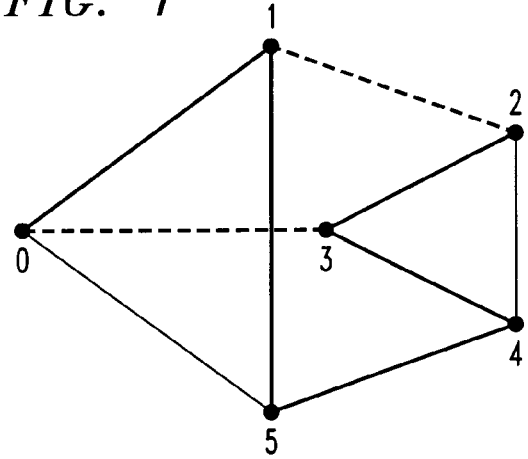

FIG. 2

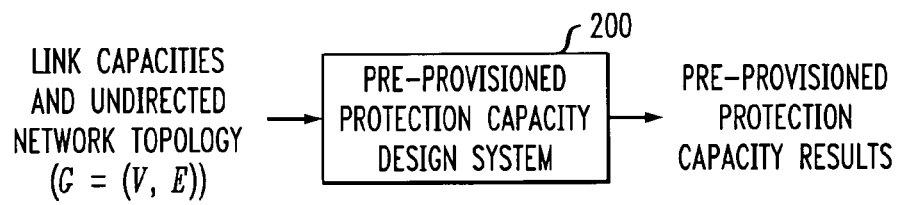

LINK CAPACITIES AND UNDIRECTED NETWORK TOPOLOGY ($G = (V, E)$) → PRE-PROVISIONED PROTECTION CAPACITY DESIGN SYSTEM ⟋200 → PRE-PROVISIONED PROTECTION CAPACITY RESULTS

FIG. 3  ⟋300

```
Let {e₁, e₂,..., eₘ} be the links sorted in non-increasing order of their capacities.
T=(V, ∅).  //The graph with vertices V and no links
for i = 1,...,m {
    if(T∪{eᵢ} does not form a cycle) {
        T = T∪{eᵢ}.
    }
}
for i = 1,...,m {
    if (eᵢ = (u, v) ∈ T) {
        p(eᵢ) = u(eᵢ).
    } else {
        p(eᵢ) = 0.
        Set the bypass tunnel for eᵢ to be the unique path in T between nodes u and v.
    }
}
```

FIG. 4

```
Let T be the tree output by Algorithm 1.
F = T.
j = 1.
for i = 1,...,m {
        if (e_i = (u, v) ∉ T and u, v are not 2-edge connected in F) {
        F = F ∪ {e_i}.
        F_j = F.
        CR_j = unique cycle in F_j consisting of e_i and the unique path in T
        joining u and v.
        e(j) = e_i.
        j = j + 1.
        }
}
for k = 1,...,j-1 {
    C_k = CR_{j-k}.
    e_{i_k} = e(j-k).
}
for k = 1,...,j-1 {
    Let C_k(e) be the links in C_k (including e_{i_k}) that are not in C_{k+1}, C_{k+2},...C_{j-1}.
    for all links e_l ∈ C_k(e) {
        w(e_l) = u(e_{i_k})/2.
        p(e_l) = u(e_l) - w(e_l).
        Set the bypass tunnel for link e_l to be the path obtained by removing
        e_l from C_k.
    }
}
for all e_l = (u, v) ∉ F {
    p(e_l) = 0.
    w(e_l) = u(e_l).
    Set the bypass tunnels for link e_l to be the two link disjoint paths between
    u and v in F.
}
```

FIG. 5

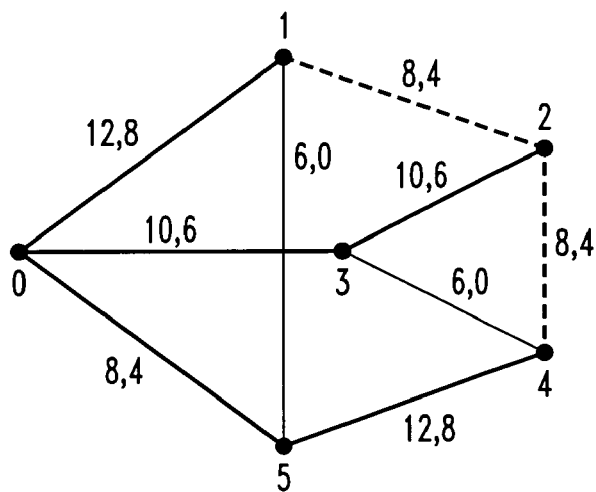

Let $e = (u, v)$ be the new link added to the network $G$.
Let $f$ be maximum flow that can be routed in $G$ (before $e$ is added) between $u$ and $v$ using only the protection capacities of the links in $G$.
$UW(e) = f$. //an upper bound on $w(e)$
$LW(e) = 0$. //a lower bound on $w(e)$
Let $W(e)$ be the largest possible integral value for $w(e)$ in the range $[LW(e), UW(e)]$ as verified by Algorithm 4. // More efficiently using binary search
$w(e) = W(e)$.
$p(e) = u(e) - w(e)$.

FIG. 6B

```
                                                                    ┌─610
┌─────────────────────────────────────────────────────────────────────┐
│ Let e = (u, v) be the given link of the given network G = (V, E).   │
│ Let W(e) be the given candidate for the working capacity for link e.│
│ Let E' = E-{e}.                                                     │
│ For all e' ∈ E' {                                                   │
│    if(p(e') ≥ W(e)) {                                               │
│        h(e') = 1.                                                   │
│    } else {                                                         │
│        h(e') = 0.                                                   │
│    }                                                                │
│ }                                                                   │
│ if (one unit of flow can be routed between u and v in the network G' = (V, E') │
│ using link capacities defined by h(e)){                             │
│     The bypass tunnel for link e is the path on which the flow is routed. │
│     return TRUE.                                                    │
│ }                                                                   │
│ For all e' ∈ E' {                                                   │
│    if(p(e') ≥ W(e)/2) {                                             │
│        h(e') = 1.                                                   │
│    } else {                                                         │
│        h(e') = 0.                                                   │
│    }                                                                │
│ }                                                                   │
│ if (two units of flow can be routed between u and v in the network G' = (V, E') │
│ using link capacities defined by h(e)){                             │
│     The bypass tunnels for link e are the two link disjoint paths on which │
│     the flow is routed.                                             │
│     return TRUE.                                                    │
│ }                                                                   │
│ return FALSE.                                                       │
└─────────────────────────────────────────────────────────────────────┘
```

```
Let e = (u, v) be the link removed from the network G.
Flag = TRUE.
For all remaining links e' ∈ G {
    if(w(e') working capacity of e' is not protected in the current network
    (as verified by Algorithm 4)) {
        Flag = FALSE.
        Break.
    }
}
if(Flag==TRUE) {
    Compute bypass tunnels for all links e' ∈ G using Algorithm 4.
} else {
    Let W(e') be current working traffic on link e' ∈ G.
    Maximum protection capacity P(e') = u(e') - W(e').
    For all links e' ∈ G {
        Uniformly increase p(e') to a maximum value P(e').
        Break when all links protected (as verified by Algorithm 4).
    }
    For all links e' ∈ G {
        Increase w(e') to the maximum value that can be protected in G
        (as verified by Algorithm 4).
    }
    Compute bypass tunnels for all links e' ∈ G using Algorithm 4.
}
```

TABLE I
RESULTS FROM REAL LIFE NETWORKS

| NETWORK | NODE COUNT | LINK COUNT | UNIFORM | | | | NON UNIFORM | | |
|---|---|---|---|---|---|---|---|---|---|
| | | | TREE | 2-EDGE | 2-EDGE-DFS | LP | TOTAL | TREE | 2-EDGE | LP |
| ARPANET | 20 | 32 | 19 | 14.5 | 12 | 10 | 914 | 616 | 489 | 343 |
| NJ LATA | 11 | 23 | 10 | 6 | 6 | 6 | 610 | 306 | 236 | 188 |
| NATIONAL | 24 | 44 | 23 | 18.5 | 13 | 12 | 1324 | 770 | 562 | 415 |
| COST 239 | 11 | 26 | 10 | 9.5 | 5.5 | 5.5 | 710 | 324 | 254 | 186 |

METHOD AND APPARATUS FOR PRE-PROVISIONING NETWORKS TO SUPPORT FAST RESTORATION WITH MINIMUM OVERBUILD

FIELD OF THE INVENTION

The present invention relates to network design techniques and, more particularly, to network design techniques for pre-provisioning networks to support fast restoration with minimum overbuild.

BACKGROUND OF THE INVENTION

Modern backbone and transport networks are highly complex networks that strive to carry services with quality-of-service (QoS) guarantees. These networks support general topologies and dynamic routing of bandwidth guaranteed connections, yet at the same time they aim to provide fast recovery from network failures. Traditionally ring-based synchronous optical networks (SONETs) have offered 50 millisecond (ms) restoration to bandwidth guaranteed services, using pre-reserved spare protection capacity and pre-planned protection paths. Pre-planning protection in rings has been especially attractive, because of the availability of exactly one backup path between any two nodes, leading to very simple and fast automatic protection switching mechanisms. However, in ring-based SONET networks, these advantages come at the cost of reserving at least half the total capacity for protection, thus requiring 100% redundancy.

Recently mesh-based networks have received much attention due to the increased flexibility they provide in routing connections, thus leading to more efficient utilization of network resources. Also, mesh networks are appealing due to the high degree of protection capacity sharing that is possible in these networks.

Designing efficient protection schemes for mesh networks that achieve the fast restoration times of ring-based SONET networks, and yet do not require the overbuild generally associated with these networks, has remained a challenging problem. Overbuild generally refers to the amount of redundancy needed to support protection. In general, most protection schemes including those for SONET and ring-based schemes have been designed to protect against a single link failure. It is also a challenging problem to design efficient protection schemes that protect against multiple link failures.

Recently, fast restoration for mesh networks has gained momentum in the context of Multi-Protocol-Label-Switching (MPLS) networks. The MPLS fast restoration mechanism, referred to as fast or local reroute, supports a local repair capability, where upon a node or link failure, the first node upstream from the failure reroutes the effected Label Switch Paths (LSP) onto bypass (backup) tunnels with equivalent guaranteed bandwidths. Bandwidth guarantees are important since it is the most likely reason for setting up QoS guaranteed LSPs. Also, one way of incorporating other QoS constraints such as end-to-end delays and losses is to convert these into an effective bandwidth requirement, for the LSPs. The MPLS fast reroute mechanism allows for bandwidth sharing between bypass tunnels protecting independent resources, thus resulting in efficient capacity utilization.

Two different techniques for local protection in MPLS networks have been proposed. The first technique is referred to as a one-to-one backup technique. The one-to-one backup technique creates bypass LSPs for each protected service carrying LSP, at each potential point (link or node) of local repair. The second technique is referred to as a facility backup technique. The facility backup technique creates a bypass tunnel to protect a potential failure point (link or node), such that by taking advantage of the MPLS label stacking mechanism, a collection of LSPs with similar backup constraints can be jointly rerouted, over a single bypass tunnel.

In general, the one-to-one backup technique does not scale well with the number of supported protected LSPs, since the number of bypass tunnels can quickly become very large, not to mention the enormous load on signaling and routing to support these extra tunnels. In addition, for implementing the one-to-one backup technique, either extensive routing extensions are needed to propagate the set of bypass LSPs and their attribute information, resulting in heavy load on the control plane, or the amount of achievable sharing of protection capacity is sacrificed, by limiting the amount of state that is propagated in the routing updates, thus requiring large amounts of spare capacity for protection. In contrast, the facility backup technique is free from many of the drawbacks of the one-to-one backup technique.

In general, the protection schemes for optical and MPLS networks can be classified based on whether the protection is local (link-based) or end-to-end (path-based), and whether the backup resources are dedicated or shared. Fast or local reroute mechanisms, outlined above, are instances of link-based protection. In path-based protection, the entire primary service carrying path is backed up by alternate protection paths, such that any failure on the primary path results in its traffic getting rerouted over its protection paths. In path-based protection the reroute is done by the end nodes of the path. Compared to link-based protection, recovery may be slower in path-based protection schemes, partly because failure information has to reach the end nodes before restoration can be initiated, and partly because even a failure of a single link may affect primary paths of many different ingress egress pairs, all of which may initiate path protection in parallel, resulting in high signaling loads and contention for common resources and crankbacks.

The protection schemes can be further classified as being pre-planned (e.g., SONET) or event-driven (dynamic). The latter involves computing bypass routes and reserving protection bandwidth at the time when the working path is provisioned. These schemes rely on heavy signaling to maintain the reservations and to effect the rerouting on the failure of a link. These schemes although very efficient in lowering the overbuild tend to have longer restoration times.

For pre-planned facility-based fast reroute, the main existing approaches are through the use of rings in mesh topology. Once the set of rings are identified, then pre-planned protection schemes (e.g., as in SONET) are employed. In some of these approaches, the network is designed in terms of rings or by partially using rings. Thus, these schemes are only applicable to constrained topologies.

Some other protection schemes provide protection by embedding rings in a mesh-based topology. In these schemes each link is covered by a cycle leading to a cycle cover for the network. Each of these cycles is provisioned with enough protection capacity to cover the links that belong to it. On the failure of the link, the working traffic is rerouted over the protection capacities in the surviving links of the covering cycle. There are two drawbacks of this problem: one, the overbuild can be significant and, second, it is hard to find the smallest cycle cover of a given network.

An improvement to these schemes is based on the notion of p-cycle. Here, the main idea is that a cycle can be used to protect not just the links on the cycle but also the chords (spokes) of the cycle, thus showing that far fewer rings may be sufficient for providing full protection. An alternative to cycle covers, intended to overcome the difficulty of finding good covers, is to cover every link in a network with exactly two cycles. A set of cycles that meets this requirement is called a double cycle cover. For planar graphs, double cycle covers can be found in polynomial-time. For non-planar graphs, it is conjectured that double cycle covers exist, and they are typically found quickly in practice. However, even for double cycle cover-based protection schemes, the required network overbuild can be significant. Note the all the ring-based approaches suffer from the drawback that after any topology change, the structure of the solution may change dramatically, thus limiting their scalability.

Non-ring based approaches to link restoration on mesh networks is generalized loop-back, where the main idea is to select a digraph, called the primary, such that the conjugate digraph, called the secondary, can be used to carry backup traffic for any link failure in the primary.

However, improved network design techniques for supporting fast restoration with minimum overbuild are needed.

SUMMARY OF THE INVENTION

The present invention provides improved network design techniques. More particularly, the invention provides network design techniques for pre-provisioning networks to support fast restoration with minimum overbuild.

In one aspect of the invention, a technique for designing a protection capacity to be reserved in a network comprises the following steps/operations. One or more link capacities associated with a network topology are obtained, wherein the network is assumed to have no pre-existing working traffic. A capacity partition is determined for at least one link in the network topology, the capacity partition comprising a working capacity portion and a protection capacity portion, the protection capacity portion being reserved for rerouting working traffic upon a failure. The capacity partition determination step/operation enables control over the number of backup tunnels, associated with the at least one link, on which working traffic can be rerouted. Further, the capacity partition determination step/operation substantially guarantees at least one of a minimal failure restoration time and a minimal overbuild. A minimal overbuild may comprise an overbuild equivalent to no more than two times an overbuild required for an optimal solution.

Further, the capacity partition determination step/operation may further substantially guarantee at least one of a minimal failure restoration time and a minimal overbuild when working traffic of the at least one link has to be rerouted on a single bypass tunnel. The capacity partition determination step/operation may further substantially guarantee at least one of a minimal failure restoration time and a minimal overbuild when working traffic of the at least one link can be split and rerouted on no more than two bypass tunnels. The capacity partition determination step/operation may further substantially guarantee at least one of a minimal failure restoration time and a minimal overbuild independent of at least one of a nature of the working traffic and a routing associated with the working traffic.

Still further, the capacity partition determination step/operation may further comprise determining the capacity partition in accordance with a spanning tree based methodology. The capacity partition determination step/operation may further comprise determining the capacity partition in accordance with a 2-edge connected graph based methodology. The capacity partition determination step/operation may further comprise adapting the capacity partition based on a change in the network topology. The network topology may comprise an optical network topology. The network topology may comprise a multi-protocol label switching (MPLS) network topology. The network topology may comprise an asynchronous transfer mode (ATM) network topology.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating a first graph for use in describing one or more illustrative embodiments of the present invention;

FIG. 2 is a diagram illustrating a pre-provisioned protection capacity design system according to an embodiment of the present invention;

FIG. 3 is a diagram illustrating a pre-provisioned protection capacity computation algorithm according to an embodiment of the present invention;

FIG. 4 is a diagram illustrating a pre-provisioned protection capacity computation algorithm according to another embodiment of the present invention;

FIG. 5 is a diagram illustrating a second graph for use in describing illustrative one or more embodiments of the present invention;

FIGS. 6A through 6C are diagrams illustrating a pre-provisioned protection capacity computation algorithm according to yet another embodiment of the present invention;

DETAILED DESCRIPTION OF PREFERRED EMBODIMENTS

Figure 7:
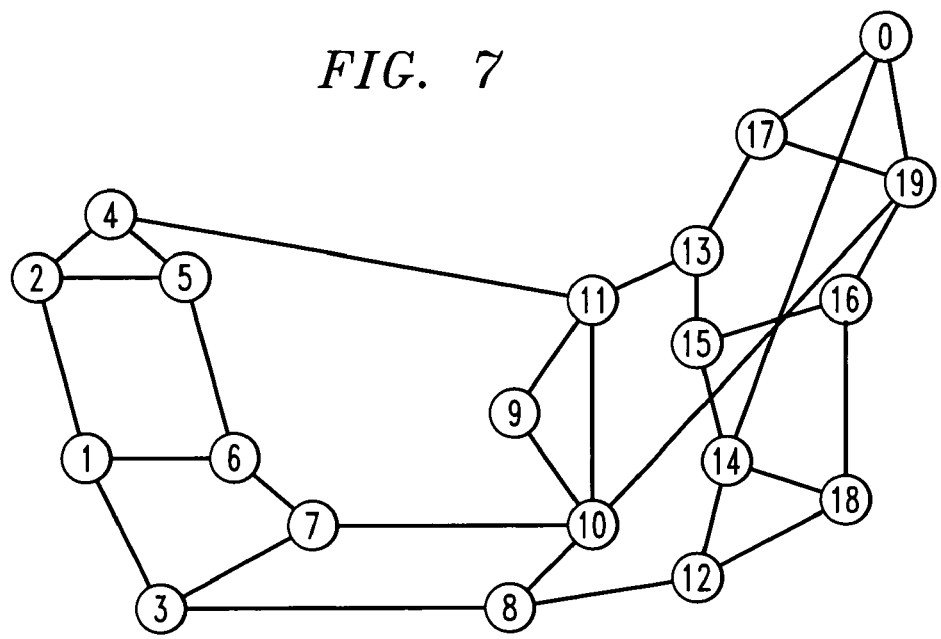
FIG. 7 is a diagram illustrating a third graph for use in describing one or more illustrative embodiments of the present invention.

The following description will illustrate the invention in the context of an exemplary MPLS network. It should be understood, however, that the invention is not necessarily limited to use with any particular type of network. The invention is instead more generally applicable to any environment in which it is desirable to perform pre-provisioning to support fast restoration with minimum overbuild. Thus, by way of example only, the techniques of the invention may also be applied to optical networks and asynchronous transfer mode (ATM) networks.

As generally used herein, the phrase "bypass (or backup) tunnel" refers to a path in the network along whose links protection capacity is reserved to carry all or a portion of the rerouted working traffic, subsequent to a failure, of a given link of the network. The phrase is not intended to be limited to any particular type of network.

The present invention addresses, inter alia, the problem of determining the least 30 amount of protection capacity (and the bypass tunnels) to be reserved in the network, so as to guarantee fast local restoration for the failure of any set of $t \geq 1$ links. The solution to the problem determines for each link, its bypass tunnels and the amount of its total capacity to be reserved for protection, so that its remaining capacity can be used for carrying working traffic. Thus, in our illustrative model, there are (at least) two pools of bandwidth, one of which can only be used for carrying working traffic, and the other one is reserved for protection (it may carry low priority best effort working traffic that can get preempted by a rerouted flow, subsequent to a failure). The pre-reserved protection capacities of the links belong to the backup pool, and on a link failure its working traffic is rerouted, on at most κ bypass tunnels, using only the available bandwidth in the backup pool. The limit of κ enables the bypass tunnel information to be stored by the head nodes, of the links, in their limited memories.

It is shown that the problem is NP-hard and the invention provides fast, computationally efficient algorithms, with bounded performance guarantees, for solving the problem. Further, the invention provides ways to update the pre-reserved backup bandwidth and bypass tunnels to accommodate topology changes.

As mentioned, even though the illustrative embodiments of the invention are presented in the context of MPLS networks, the principles of the invention are equally applicable to other technologies (e.g., Optical, ATM, etc.), where local reroute may be used to provide restoration guarantees to service carrying circuits, in mesh topologies. The pre-computed bypass tunnels may be signaled at the time of failure, and the protection capacity needed for the signaled bypass tunnel, is guaranteed to be available in the backup pool.

The remainder of the detailed description is organized as follows. Section I defines the illustrative problem and illustratively summarizes our results. In Section II and Section III, we present efficient illustrative algorithms for the problem and illustratively analyze their performance. Section IV provides illustrative implementation details, including how to handle changes in topology. In Section V, illustrative simulation results are presented. Section VI describes illustrative extensions. Section VII describes an illustrative hardware implementation.

I. Problem Description and Results

Assume that a capacitated network is given in which a pre-planned facility-based fast reroute methodology is used to provide protection against link failures. The link capacities are assumed to be integral to model the number of fibers or the smallest switchable bandwidth on a link. The problem is to partition the link capacities into working and protection capacities (both integral) to guarantee link restoration for the failure of any set of $t \geq 1$ links, with the goal of minimizing the total amount of bandwidth used for protection. We also require that on failure of a link the working traffic of the link can be rerouted on at most κ bypass tunnels. In addition, we also consider keeping the network protection capacities updated, as links are added or deleted.

The problem described above is the most general version of the problem considered. For ease of presentation, we will describe the results mainly for a basic version of the problem, and will give the main ideas, in Section VI, as to how the algorithm can be extended, to support the more general version of the problem. In the basic version of the problem, we assume protection is to be provided against single link failure (t=1) and that the network links have the same total capacity in each direction (symmetric bi-directional links). Thus, we can model the network as an un-directed network. We also assume that there are no parallel links. Since parallel links fail together, they can be replaced by a single link, of total capacity equal to the sum of the capacities of the individual parallel links. Given a network with integral link capacities u(e) and an integer κ, the problem is to find for each link e, an integral protection capacity $0 \leq p(e) \leq u(e)$, and a set of at most κ bypass tunnels B(e), for protecting link e with bandwidth guarantees, such that:

1) By reserving p(e) of each link e's capacity for protection, the network can recover from single link failures via link based local restoration. This means that on the failure of link e its maximum primary (working) traffic, which is w(e)=u(e)−p(e), can be rerouted onto its bypass tunnels B(e), and the reserved protection capacity, on the surviving links, is sufficient to meet the bandwidth requirements of the bypass tunnels. Here bandwidth sharing among bypass tunnels is assumed.

2) Each bypass tunnel of a link e, with $r \leq \kappa$ bypass tunnels, should be able to support a rerouted traffic of approximately w(e)/r, on the failure of link e. In addition, all together these r bypass tunnels should be able to support the entire working traffic on link e. We will assume that on the failure of link e, an integral amount of traffic is rerouted on each of its bypass tunnels.

3) The total protection capacity $\Sigma_e\, p(e)$ is minimized.

The reason for constraining the number of bypass tunnels for each link (by the parameter κ) and their minimum bandwidth, is that in practice the network may support high bandwidth connections (ATM VCs or MPLS LSPs, etc.), which cannot be split. Also, the head end nodes have only limited resources to store paths of too many bypass tunnels. Finally, if these tunnels cannot be pre-provisioned in the network, they have to be set up subsequent to a failure. Thus, by limiting the number of bypass tunnels per link, the desired recovery times can be achieved. Thus, ideally κ should be one. However, one advantage of having κ>1 is that for larger values of κ, the total protection capacity needed is usually much less. However, for most networks, the total protection reserved is close to the best possible, even when there are at most two bypass tunnels per link. We illustrate these observations with an example.

Consider the six node graph given in FIG. 1, with uniform link capacities: u(e)=20 units for all links e. It can be shown that when splitting is not allowed (κ=1), an optimal solution should set p(e)=w(e)=10, for all links e, resulting in 90 units of total reserved protection capacity. Note that this is a feasible solution, since on the failure of any link, say link (1, 2), its working traffic of at most 10 units can be routed on the protection capacity of a surviving path, say 1, 0, 3, 2. Also, it can be shown that when arbitrary splitting is allowed, then any solution should reserve at least 60 units of total protection capacity. This bound is also achieved with 2-splitting (κ=2), where p(e)=w(e)=10, is set on the hamiltonian cycle 0, 1, 2, 3, 4, 5 and p(e)=0 is set for all other links. In this case when a link outside the hamiltonian cycle, say (1, 5), fails then its working traffic, of at most 20 units, is split equally among its two incident paths, 1, 0, 5 and 1, 2, 3, 4, 5 on the hamiltonian cycle. When a link, say 1, 0 on the hamiltonian cycle fails, its working traffic, of at most 10 units is routed on the surviving hamiltonian path, 1, 2, 3, 4, 5, 0.

Thus in practice, 2 comes close to being the best value for κ, which is what will be assumed in this illustrative description. It can be shown that when κ is unbounded and arbitrary splitting of the rerouted traffic over the bypass tunnels is allowed (no limit on the minimum capacity of the bypass tunnels), then the above mentioned problem can be solved optimally in polynomial time, using linear programming techniques. We show however that with the constraints outlined above, our problem is NP-complete.

One of the inventive algorithms is applicable to networks where the splitting of the rerouted traffic is not allowed (i.e., $\kappa$ has to be exactly one). This algorithm is guaranteed to produce a solution, in which there is no splitting of the rerouted traffic. However, as expected, this algorithm reserves more spare capacity for protection. A second algorithm may create two bypass tunnels for some links in the network, but reserves close to lowest protection capacity in the network. We show that in the worst case both these algorithms produce a solution, which reserves at most twice the protection capacity of the optimal solution.

Putting our results in perspective of the existing schemes described above, the inventive algorithms may reserve only a fraction of the total capacity of the network for protection. On the other hand, all the ring-based schemes (with the exception of p-cycle) and those based on generalized loop-back, may reserve at least half the total capacity for protection. For example, for a network with uniform capacities, n nodes and m links, the inventive algorithms may reserve at most n capacity for protection, while most ring-based schemes (including SONET) will reserve m/2 capacity for protection. Note that m can be arbitrarily large compared to n, depending on the average degree of the network. We also show that changes in topology can be easily handled with the inventive solution, which is not always the case for the existing schemes.

The inventive algorithms are very efficient to implement which makes it particularly amenable to devices, such as network elements (e.g., Label Switch Router or LSR), with limited computational resources.

II. 2-Approximation Algorithms

In this section, we present two fast algorithms, for the problem of minimizing the total amount of pre-provisioned protection capacity, and for computing the set of pre-installed bypass tunnels, to ensure that the network is fully link protected. We establish that both the algorithms have the same worst case performance. However, the two algorithms obtain quite different solutions, where one algorithm reserves either all or none of the capacity of every link for protection, while the other one ensures that only a portion of any links capacity is reserved for protection. Also, one algorithm only outputs a single bypass tunnel per link, while the other algorithm may require that, on failure of some set of links, the traffic is rerouted over two bypass tunnels, resulting in much lower total reserved protection capacity on the links. Thus, depending on the needs of the service provider, one algorithm may be better suited than the other. We show that the solution output by both the algorithms, reserves no more than twice the protection capacity reserved by any optimal solution. It is to be appreciated that this is what is meant by a "2-approximation" solution.

Before describing the illustrative pre-provisioned protection capacity design algorithms (methodologies), reference is made to FIG. 2. FIG. 2 is a block diagram illustrating a design system for computing pre-provisioned protection capacity according to an embodiment of the present invention. In general, the design system 200 receives as input an undirected network topology with link capacities. One or more of the design methodologies described herein are then employed to compute the pre-provisioned protection capacity results (i.e., the protection capacity to be reserved).

Design system 200 may be a standalone computation system or it may be operatively connected to one or more components of a network for which it is computing results. Results computed by design system 200 may be implemented automatically and/or manually so as to realize an efficiently designed network.

Let the given undirected network be denoted by G=(V, E), where V is the set of vertices and E the set of bidirectional links. Recall that u(e) denotes the total capacity of link e. We use the notation p(e) and w(e) to denote the protection and working capacities on link e, as assigned by the algorithm. Note that u(e)=p(e)+w(e). Let $e_1, e_2, \ldots e_m$ denote an ordering of the links in non-increasing order of their capacities. Thus, for i>j, we have $u(e_i) \leq u(e_j)$.

A. Algorithm Based on Spanning Tree Construction

FIG. 3 illustrates a spanning tree construction algorithm 300 (methodology), according to an embodiment of the present invention. We assume without loss of generality that G is connected. A graph G is connected if between every pair of nodes u and v there is a path in G that connects u to v. This assumption is because otherwise the algorithm can be independently run on each connected component. The algorithm maintains an acyclic graph (collection of forests) T, where T initially consists of only the nodes V, and on termination is a spanning tree of G. At step i, link $e_i$ is considered, and if it does not create a cycle in T then it is added to T. Thus, after m steps, all links are considered and T is a tree. The algorithm then sets p(e)=u(e), for all links in the tree and sets p(e)=0, for all other links. Note that since there is never any working traffic carried on the links of T, there is no need to provide any protection for a failure of any such link. Thus for these links, there are no bypass tunnels. For a link e=(u, v), which is not in T, its single bypass tunnel is the unique path from u to v in T.

In validating the algorithm, we show that the working traffic on all links in the solution output by the algorithm is link protected, thus establishing that the solution is feasible. In other words, we show that if a link e with working traffic w(e) is cut, then its bypass tunnel is able to support a flow of w(e) unit. Thus, if e' is a link on the bypass tunnel for link e, then we have to show that $p(e') \geq w(e)$. However, since the links on the bypass tunnel, are links in T, they have p(e')=u(e'). Also, by construction, the links e that need protection are not in T, and they have w(e)=u(e). Hence, we have to show that $p(e')=u(e') \geq w(e)=u(e)$. We prove this by contradiction. So, let u(e')<u(e). Let e=(u, v). Note that e' is a link in the unique path from u to v in T. Since u(e')<u(e), the algorithm must consider link e before link e'. Since, link e is not added to T, there must exist a path connecting node u and v in T, when link e is considered, and also when link e' is considered. But then, adding e' to T would have created a cycle. Hence e' cannot be in T, which is a contradiction. We show later that the solution output by this algorithm uses no more than twice the optimal protection capacity.

B. Algorithm Based on 2-Edge Connected Graph Construction

FIG. 4 illustrates a 2-edge connected graph construction algorithm 400 (methodology), according to an embodiment of the present invention. We assume without loss of generality that G is 2-edge connected. A graph is 2-edge connected if it stays connected even after the removal of any single link. This assumption is because, if there is a link e whose removal disconnects G then no bypass tunnel is possible for link e. Thus, link e can not have any working traffic (w(e)=0) and thus, all its capacity must be reserved for protection (p(e)=u(e)). Thus, after setting p(e)=u(e) and w(e)=0, such a link can be removed from the network. By repeating this procedure until there are no cut-links we can ensure that the network has only 2-edge connected components, each of which can be handled independently by the algorithm. Recall that $e_1, e_2, \ldots e_m$ denotes an ordering of the links in non-increasing order of their capacities $u(e)$.

The algorithm starts from the tree T, created by the first algorithm, and adds more links to it, as follows. At all times the algorithm maintains a connected graph F. F is initially set to T. The algorithm considers the links $e_i$ not in T, in the order of increasing index i, and hence in the order of non-increasing capacity. If while considering link $e_i=(u, v)$, the nodes u and v are not 2-edge connected in F, then link $e_i$ is added to F. We say a pair of vertices u and v are 2-edge connected in F, if removal of any single link in F, does not disconnect u from v. Note that, just after link $e_i$ is added by the algorithm to F, there is a unique cycle $C_i$ in F which contains link $e_i$, and all other links in $C_i$ are from T.

For links in F, the protection capacity and bypass tunnels are computed as follows. Let $e_{i_1}, e_{i_2}, \ldots e_{i_K}$ be the links added by the algorithm to the tree T, arranged in opposite order from which the algorithm considered them. Thus, $i_1 > i_2 > \ldots i_k$, and $u(i_1) \leq u(i_2) \leq \ldots u(i_\kappa)$. Let $F_1 = F$ be the graph after link $e_{i_1}$ is added to F. Let $e_{i_1} = (u_1, v_1)$. Let $C_1$ be the (unique) cycle in $F_1$ consisting of $e_{i_1}$ and the unique path in T joining nodes $u_1$ and $v_1$. Note that by construction link $e_{i_1}$ is the least capacity link on $C_1$. Thus, for every link e on $C_1$, we have $u(e) \geq u(e_{i_1})$. Let $C_1(e)$ include the set of tree (T) links of $C_1$ which are not part of any other cycle $C_2, \ldots, C_\kappa$. Also let $e_{i_1} \in C_1(e)$. The algorithm sets the working capacity $w(e)$ of all links e in $C_1(e)$ to $u(e_{i_1})/2$. Thus, the protection capacity of these links e in $C_1(e)$ is set to $u(e) - u(e_{i_1})/2 \geq u(e_{i_1})/2$. Note that by dividing by 2, we may violate the integrality assumptions. Hence, to be precise, we need to take floor of the resulting value, for the working capacity. However, in order to keep the presentation simple, we will assume that all link capacities are even integers, and thus we can omit the floors. All our results hold however, even when link capacities are arbitrary integers. The algorithm assigns a single bypass tunnel to every link e in $C_1(e)$, which is the path obtained by removing link e from the cycle $C_1$. Next, all the links in $C_1(e)$ are removed from $F_1$, to yield the graph $F_2$.

Let $e_{i_2} = (u_2, v_2)$. Let $C_2$ be the cycle in F consisting of $e_{i_2}$, and the unique path in T, joining nodes $u_2$ and $v_2$. Note that $C_2$ is also a cycle in $F_2$, since none of the links in $C_2$ are in $C_1(e)$. Let $C_2(e)$ include all those links on the cycle $C_2$ which are not part of any other cycle $C_3, \ldots, C_\kappa$. Also let $e_{i_2} \in C_2(e)$. As before, the algorithm sets the protection capacity of these links e in $C_2(e)$ to $u(e) - u(e_{i_2})/2$. The algorithm assigns a single bypass tunnel to every link e in $C_2(e)$, which is the path obtained by removing link e from cycle $C_2$. Next the links in $C_2(e)$ are removed from $F_2$, to yield the graph $F_3$ and the same procedure is continued for all the graphs $F_3, F_4, \ldots F_\kappa$. Note that graph $F_{\kappa+1}$ has no links, since every link of F is in one of the cycles $C_1, C_2, \ldots C_\kappa$.

The algorithm sets the protection capacity of all the links, which are not in F, to zero. Each of these links e is assigned two bypass tunnels, as follows. Let $e=(u, v)$. Note that when e is considered by the algorithm (while constructing F), nodes u and v are 2-edge connected in F (that is why e is not in F). Thus when e is considered by the algorithm, there must exist two link disjoint paths between u and v in F. The two bypass tunnels for link e are these two paths.

We further illustrate the algorithm using FIG. 5. Here, each link has two labels, the first one is its total capacity and the second one is its protection capacity, as set by the algorithm. The maximum cost spanning tree T, as found by the algorithm, is shown in thick solid lines. F is initially set to T. Next, the algorithm considers the remaining links in the decreasing order of their capacities (i.e., links (1, 2), (2, 4), (1, 5) and (3, 4)). Links (1, 2) and (2, 4) are added to F in that order, since their end points are not 2-edge connected in F. Links (1, 5) and (3, 4) are not added to F, since their end points are 2-edge connected in F, when they are considered. $F_1$ is set to F. Now we consider link (2, 4). The unique cycle $C_1$ containing this link and tree (T) links is 2-3-0-5-4-2. Links (0, 5) and (4, 5) are only on cycle $C_1$ in $F_1$. So, the working capacities of each of these links, including link (2, 4), is set equal to ½× capacity of link (2, 4), which is 4. Next, $F_2$ is obtained by removing links (2, 4), (0, 5) and (4, 5) from $F_1$. For link (1, 2), the unique cycle $C_2$ is 1-0-3-2-1. Since, all these links are part of only one cycle in $F_2$, each of these links working capacity is set to half of capacity of link (1, 2), which is 4. All links outside F have their protection capacity set to 0.

In validating the algorithm, we first show that the graph F output by the algorithm is 2-edge connected. Note that, if there is a cut-link (u, v) in F, then (u, v) must also be in T (since u and v must be connected in T). Since, G is assumed to be 2-edge connected, there must be some link $e_j$ in G, which is not in T or F, which when added to T, must create a cycle containing link (u, v). Let $e_j$ be such a link, with the smallest index j. Then, link $e_j$ must have been considered by this algorithm, and at the time when it is considered by the algorithm, u and v cannot be 2-edge connected in F. Hence, the algorithm must add $e_j$ to F. But then (u, v) cannot be a cut-link of F, a contradiction. Now we show that in F all links are protected.

It is to be appreciated that the algorithm outputs a feasible solution, in which the working capacity of all links is protected.

This may be proven as follows. We first show that on any link in F, at least half of its capacity is reserved for protection. This holds trivially for the links in F, that are not in T. For a link e in T, its protection capacity is assigned by the algorithm, while considering some link $e_{i_j}$, and some cycle $C_j$, such that e is in $C_j(e)$. Note that since e is in T, we have $u(e) \geq u(e_{i_j})$. By construction links e's protection capacity is set to $u(e) - u(e_{i_j})/2 \geq u(e)/2$, thus implying the result.

Next, we show that the links of $C_j$, $1 \leq j \leq \kappa$, in the above description of the algorithm, have at least $u(e_{i_j})/2$ capacity reserved for protection. This holds trivially for the links in F that are not in T. Let e be a link of $C_j$ which is in T. Then, $u(e) \geq u(e_{i_j})$ and since at least half of its capacity is reserved for protection, its protection capacity is at least $u(e_{i_j})/2$.

We now show that the network can recover from any single link failure. As before, we show that if a link e, with working traffic $w(e)$ is cut, then its bypass tunnel is able to support a flow of $w(e)$ unit. We consider three cases for the failed link e.

Let $e=(u, v)$ not be in F. Thus, when e is considered by the algorithm (while constructing F), u and v are 2-edge connected. Hence, by construction, the two bypass tunnels for e are two link disjoint paths in F between u and v. Consider the graph formed by just the links in these two bypass tunnels. It has some links which are not in T, and since they were considered by the algorithm before link e, they all have at least as much capacity as link e. Let e' be a link of T in this graph. Since the end points of e' are 2-edge connected (otherwise e' cannot be part of the bypass tunnel), the link e' must be contained in some cycle where one of the links e'' is not in T. By design, since e'' is not in T, we must have that the capacity of e' is at least that of e'', which is at least as much as the capacity of link e (since e'' is considered before e by the algorithm). Thus, each link on the two bypass tunnels, has at least as much capacity as link e. But then, as shown before, each of these links has at least $u(e)/2$ capacity reserved for protection. Hence half of link e's working traffic, can be rerouted on each of the two bypass tunnels.

Next, let $e=(u, v)$ be in F, but not in T. Then $e=e_{i_j}$ for some j, in our notation presented earlier. Consider the cycle $C_j$. The bypass tunnel for e is the path obtained by removing link e from $C_j$. As shown earlier all the links of $C_j$ have at least $u(e_{i_j})/2$ capacity reserved for protection. Thus, the entire working traffic on link e, which is at most $u(e_{i_j})/2$, can be rerouted over its bypass tunnel.

Finally, let $e=(u, v)$ be in T, and hence in F. Then, there exists some link $e_{i_j}$ in F, (but not in T) such that e is in $C_j(e)$, and the bypass tunnel for link e is the path, obtained by removing link e from $C_j$. By construction the working capacity of link e is $u(e_{i_j})/2$, and as shown earlier, all the links of $C_j$ have at least $u(e_{i_j})/2$ capacity reserved for protection. Thus, the entire working traffic on link e, can be rerouted over its bypass tunnel.

C. Uniform Capacity Case: Practical Consideration

In the case when all the links have the same total capacity ($u(e)=u$, for some integer u), then both the algorithms may consider the links in any arbitrary order. The worst case guarantees, that we show later, hold for any such order. However, in practice some orderings may be better than other ones. Here we present a scheme based on one such ordering. Note that when all links have the same capacity u, the algorithm sets $p(e)=u/2$ for all links in F, and $p(e)=0$ for all links outside F. Thus, the amount of protection capacity reserved by the algorithm, is directly proportional to the number of links in the 2-edge connected graph F.

In order to minimize the number of links in the 2-edge connected graph F, we propose the following algorithm. Let T be obtained by doing a DFS (Depth First Search) on G. The algorithm to construct F, starting from T, is modified as follows. At any step, the algorithm considers that link $e=(u, v)$ to add to F, for which, u and v are not 2-edge connected in F, and the number of links on the unique path from u to v in T, that are not in any cycle of F, is maximized. We can show that the worst case performance of this heuristic is the same as the algorithm outlined above. However, in practice, this algorithm finds solutions with lower total protection capacity. As an example, consider the network in FIG. 1, with uniform link capacities. The DFS tree T, is shown in thick solid lines. The algorithm adds links (0, 3) and (1, 2) (shown as thick dashed lines) to T, in that order, to construct F. All these links in F have half their capacity reserved for protection, and the remaining two links in G, have no capacity reserved for protection. Thus, the total protection capacity reserved by the algorithm, is at most 16.7% more than the amount reserved by the optimal solution.

III. Analysis

In this section, we show that the algorithms presented in Section II have sufficient worst case performance. Specifically, we show that these algorithms are guaranteed to find a solution with total protection capacity no more than twice that of the optimal solution.

First, we establish a lower bound on the amount of total protection capacity that is needed by any solution.

A. Lower Bound

Let the network have n nodes denoted by the set V. Let $\delta(v)$ denote the set of links incident on node v. Let the maximum capacity of any link incident on node v be $M(v)$. Thus, $M(v)=\max_{e\in\delta(v)} u(e)$.

It is to be appreciated that any solution must reserve at least $\Sigma_{e\in V} M(v)/2$ total protection capacity on the links of the network.

This may be proven as follows. The following applies, even when there is no limit on the number of bypass tunnels for the links, and even when the working traffic is split arbitrarily among the bypass tunnels. Consider any solution. Let v be a node and let e be a link of capacity $u(e)=M(v)$, incident on node v. On the failure of link e, the working traffic on link e must be rerouted over the remaining links in $\delta(v)$. Since, the working traffic of link e can be as large as $u(e)-p(e)$, the sum of the protection capacities of the remaining links in $\delta(v)$ must be at least $u(e)-p(e)$. Thus, the total protection capacity on all the links in $\delta(v)$ must be at least $u(e)-p(e)+p(e)=u(e)=M(v)$. Consider the sum $2\Sigma_e p(e)$. Note that this equals $\Sigma_{v\in V} \Sigma_{e\in\delta(v)} p(e) \geq \Sigma_{v\in V} M(v)$. Thus, $\Sigma_e p(e) \geq \Sigma_{v\in V} M(v)/2$.

When all links have the same capacity $u(e)=u$, for all e, then at least $un/2$ total protection capacity is reserved by any solution.

Now we show that the algorithms described earlier are 2-approximation algorithms.

B. Algorithm Based on Spanning Tree Construction

Let T be the tree (forest) found by the algorithm. We first show that the total capacity of the links of T is at most $\Sigma_{v\in V} M(v)$.

The total capacity of the links in T is at most $\Sigma_{v\in V} M(v)$.

This may be proven as follows. The proof uses a charging argument, where the capacity of each link in T is charged to at least one vertex in V, such that the total capacity charged to each vertex v, is at most $M(v)$. This implies that the total capacity of the links of T is at most $\Sigma_{v\in V} M(v)$. The charging works as follows. Let u be some arbitrary vertex in V. Let S be a subset of vertices, which is initially set to $S=\{u\}$, and in the end is equal to V. At each step the charging scheme picks one unpicked link of T, that connects some vertex in S to some vertex not in S. Note that such a link must always exist as long as there is at least one unpicked link of T. Let the charging scheme pick link $e=(x, y)$ with x in S and y not in S. The capacity of link e is charged to vertex y. Thus, y gets a charge of $u(y)$, which is at most $M(y)$, since link e is one of the links in $\delta(y)$. At this point S is set to $S \cup \{y\}$, and the charging scheme continues by picking another unpicked link from T, that connects some vertex of S to some vertex not in S. Note that in this charging scheme, each vertex is charged at most once, since it is charged only when it is brought into S. Also, as shown above the charge on any vertex y is at most $M(y)$, thus establishing the result.

It is to be appreciated that the spanning tree based algorithm is a 2-approximation algorithm. This may be proven in a similar manner as above.

C. Algorithm Based on 2-Edge Connected Graph Construction

It is to be appreciated that the algorithm based on 2-edge connected graph construction is a 2-approximation algorithm, This may be proven as follows. Recall that this algorithm starts out with the tree T, created by the first algorithm and adds more links to it, while adjusting the reserved protection capacity on the tree links and the newly added links. As shown above, the total protection capacity reserved (which is all on T) by the spanning tree based algorithm is at most twice the protection capacity reserved by an optimal solution. By using a charging argument, we show that as link protection capacities are updated by this algorithm, the total protection capacity does not increase, thus implying that the total protection capacity of the solution output by this algorithm is also at most twice the protection capacity reserved by an optimal solution.

Let $e_{i_1}, e_{i_2}, \ldots e_{i_\kappa}$ the links added by the algorithm to the tree T, arranged so that $i_1 > i_2 > \ldots i_\kappa$, and thus $u(i_1) \leq u(i_2) \leq \ldots$ $u(i_\kappa)$. Recall that as shown earlier, link $e_{i_1}$ is in a cycle $C_1$ in $F_1$, all of whose other links are in T. Thus, link $e_{i_1}$ is the least capacity link on $C_1$. As before, let $C_1(e)$ include those links of $C_1$ which are on a single cycle ($C_1$) in F. In addition, link $e_{i_1}$ is also in $C_1(e)$. Recall that the algorithm increases the protection capacity of link $e_{i_1}$ by $u(e_{i_1})/2$, while at the same time decreasing the protection capacity of all other links in $C_1(e)$ by $u(e_{i_1})/2$ each.

We show that there is at least one link $e \in T$ in $C_1(e)$. The proof is by contradiction. If there is no such link e then just before $e_{i_1} = (u, v)$ is added by the algorithm to F, each of the link on the path joining u with v in T, is already in some cycle. Thus, u and v are 2-edge connected just before link $e_{i_1}$ is added by the algorithm. However in this case, the algorithm would not add link $e_{i_1}$ to F, a Contradiction.

The increase in the protection capacity of link $e_{i_1}$, is balanced out by an equal or larger decrease, in the protection capacity of at least one link $e \in T$, which is in $C_1(e)$. Similarly, the increase in the protection capacity of link $e_{i_2}$, can be charged to an equal or larger decrease in the protection capacity of some other link $e \in T$, which is in $C_2(e)$, and so on. This holds for all links $e_{i_j}$, that are added by the algorithm to F. Also each link of e in T gets charged at most once, where the charge on e is at most half its total capacity u(e). Thus, the solution reserves no more than twice the total protection capacity reserved by any optimal solution.

It can be shown that uniform capacity case given above is also a 2-approximation algorithm.

D. NP-Completeness Result

In this section, we show that even a simple version of the problem is NP-complete.

For a given value P, the problem of determining if there exists a solution that reserves at most P total protection is NP-complete for $\kappa=2$. Furthermore, this holds even when all u(e) are equal.

This may be proven as follows. Note that given a solution to the problem (the protection capacities on each link and the bypass tunnels for each link), it can be verified in polynomial time if it is a feasible solution for protecting against any single link failure, and hence the problem is in NP.

Consider an instance of the problem for $\kappa=2$ with all edge capacities u(e)=2. In any solution to this problem, each links working traffic is rerouted (split equally into integral flows) on at most two bypass tunnels.

We reduce the problem of determining if there exists a hamiltonian circuit in a given connected graph to this problem. The reduction sets P=n and sets every link capacity to 2. It is asserted that the given connected graph has a hamiltonian circuit if and only if the reduced instance has a solution of total protection capacity at most n. Let the graph have a hamiltonian circuit. We set p(e)=w(e)=1, for all links e in the hamiltonian circuit, and we set p(e)=0 and w(e)=2, for all the other links e. Note that this solution has total protection capacity exactly n=P. Each link e in the hamiltonian circuit has a single bypass tunnel, which is the hamiltonian path obtained by removing e from the hamiltonian circuit.

A link (u, v) which is not on the hamiltonian circuit has two bypass tunnels, corresponding to the two paths connecting node u to v in the hamiltonian circuit. Thus, the bypass tunnels only use the links of the hamiltonian circuit, each of which has one unit of capacity reserved for protection. It is easy to see that this is a feasible solution.

The proof in the other direction works as follows. Let the optimal solution of the reduced instance reserve at most P total protection capacity. Note that any solution to this instance must use at least n=P protection capacity. Hence the optimal solution must use exactly P=n protection capacity.

Consider any link e with p(e)=2 in the optimal solution. Let e=(u, v). Then it must be the case that no other link e' incident on node u or node v can have p(e')>0 in this solution. This is because, as shown above, for every node w we have $P(w) \geq M(w)=2$, where P(w) is the total protection capacity on the links incident on node w (links in $\delta(w)$). Thus, if some link e', other than link (u, v), incident on say node u has p(e')>0 then P(u)>2. In that case, the total protection capacity reserved by the solution, which is shown above as at least $\Sigma_v P(v)/2$, would be strictly greater than n, leading to a contradiction. Thus, neither node u or node v can have another link e incident on it, with p(e)>0. A consequence of this is that no bypass tunnel, in the optimal solution, can contain a link e for which p(e)=2. This is because a bypass tunnel must have at least two links, each with strictly positive protection capacity reserved on it. Thus, a link e with p(e)=2 is not useful to any solution, implying that by setting p(e)=0, we can decrease the cost of the optimal solution, while not changing its feasibility. Thus, there must not exist any links e with p(e)=2 in the optimal solution.

A similar argument shows that, in the optimal solution, for any node v there are at most two links e in $\delta(v)$ with p(e)=1. Let S be the set of links with p(e)=1, in the optimal solution. Since, there are no links with p(e)=2 in the optimal solution, we must have that the number of links in S is exactly n. Note that the graph formed by the links in S is connected, since all the bypass tunnels must only use links in S. Therefore, if it has two or more connected components, say $S_1$ and $S_2$, then since the original graph is connected, there must exist a link e which is not in S, with one endpoint in $S_1$ and the other endpoint in $S_2$ with w(e)=2. Note that link e is not protected in the optimal solution, and hence such an e does not exist. Moreover, the graph formed by links in S is 2-edge connected. This is because, otherwise the working traffic (of one unit) on the failure of a cut-link e of S cannot be routed over the protection capacities on the surviving links (remaining links in S).

The only possible solution with these properties for S (n links and 2-edge connected) is that the links of S must form a hamiltonian circuit. Thus showing that the given graph must have a hamiltonian circuit.

IV. Topology Change Implementation

So far, we have looked at the problem of computing the initial set of protection capacities and bypass tunnels, to be pre-provisioned in a network at startup. This initial set of values may be pre-provisioned in the network by a management system. Subsequent updates to these, to deal with changes in topology, may be performed by the network in conjunction with the management system. To this end, the reserved link protection capacities may be advertised as part of the Link Status Advertisement (LSA). In order to ensure there is no over-subscription of protection bandwidth, the bypass tunnels may be pre-provisioned, in the network, each with zero bandwidth each. Next, we consider topology changes and describe an inventive algorithm to deal with them.

FIGS. 6A through 6C illustrate a topology change algorithm (methodology), according to an embodiment of the present invention. More particularly, FIG. 6A illustrates a link add portion 600 of the algorithm, FIG. 6B illustrates a check link working capacity feasibility portion 610 of the algorithm, and FIG. 6C illustrates a link delete portion 620 of the algorithm.

The algorithm computes updated protection capacities and bypass tunnels following a topology change. We assume a central server model for computing the updated values, where the server is implemented as a Label Switch Router (LSR) in the MPLS network. The algorithm can be modified, to operate in a distributed implementation. However, for ease of exposition we will assume a centralized model.

The LSR server monitors the LSA updates from the network to identify changes in topology. Following a topology change, it re-computes the new solution and updates the network with the new solution. For illustrative purposes, we describe two basic topology update operations: the addition of a link and the deletion of a link. However, the invention is not limited to these operations. In the following, we will assume κ=2. The case when at most one bypass tunnel is allowed per link can be similarly handled.

When a new link e=(u, v) is added, the only update to the solution is the protection capacity and the bypass tunnel for link e. The amount of protection capacity reserved on e depends on how much protection capacity is currently available between nodes u and v in the network. This can be determined using a max-flow computation on the protection capacities of the links of the network. Depending on how much protection capacity is available, the algorithm computes a lower bound on the amount of protection capacity to be reserved on the link. Having determined a lower bound on the protection capacity for link e, and hence an upper bound on the working capacity of link e, the algorithm attempts to maximize the amount of working capacity (up to the upper bound) that can be assigned to link e, without changing any other links protection or working capacity. To test whether a given amount w of working capacity can be assigned to the link, the algorithm solves a max flow problem on an auxiliary unit capacity graph. In addition to determining if w is feasible, the max flow computation also yields the (at most two) bypass tunnels for link e when w is used as working capacity on link e. Next, to maximize the working capacity w that can be assigned to link e (up to the upper bound), the algorithm uses a binary search on the range of allowed values for w.

Next we consider the case when a link e is deleted from the network. The easy case is when none of the bypass tunnels of any of the surviving links contains link e. In this case there is nothing to be done. However, note that even if a bypass tunnel of link e' contains link e, link e' may still be protected in the new network, since there may exist another bypass tunnel for link e' using only the protection capacities of the surviving links. In this case only, the bypass tunnels for link e' need to be updated. This can be done easily by considering e' to be a newly added link to the new network and then by using the procedure described earlier, for the link addition case, to determine whether link e' can be assigned a working capacity of w(e'). Note that this way, the new bypass tunnels for link e' can also be computed.

Now, consider the case when there is at least one link e' which is not protected in the new network. In this case, the protection capacities of other links have to be updated as well. Note that, the amount of slack on a link, for the protection capacity, is the difference of its working capacity and the amount of working traffic currently being carried by the link. This gives an upper bound on how much the links protection capacity can be increased. The algorithm for updating the links protection capacity operates in two phases. In the first phase, all the link protection capacities are uniformly increased (including link e'), to their upper bound, until all links e' are protected. In the second phase, the algorithm lowers the protection capacity of those links that have a slack in their protection capacity. Finally, the algorithm updates the bypass tunnels for all the links.

V. Simulation Results

Figure 9:
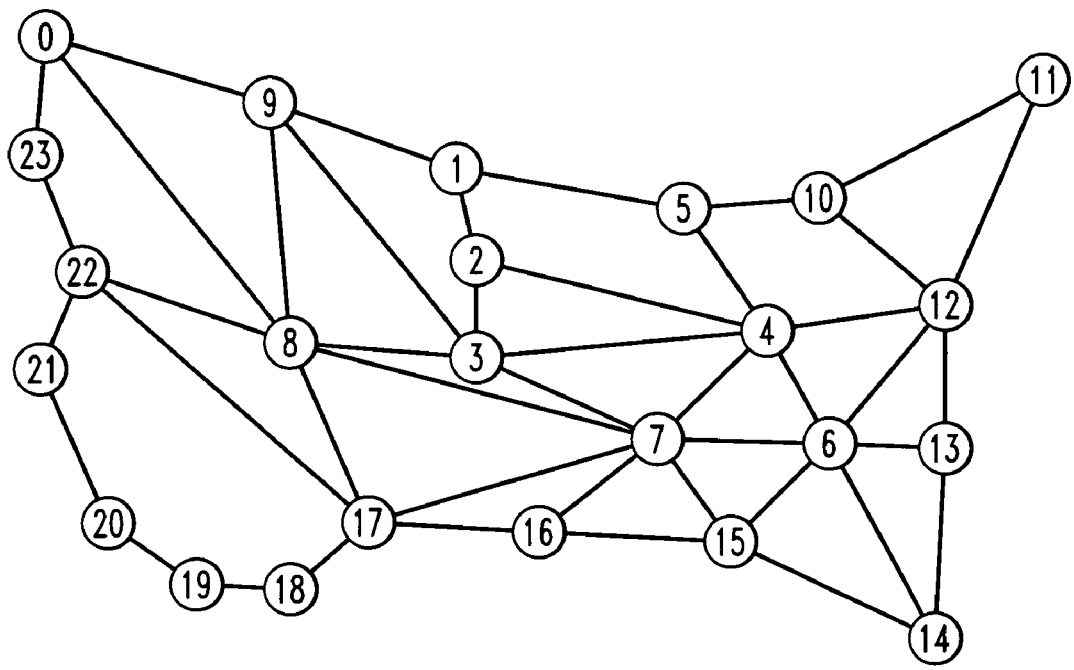
FIG. 9 is a diagram illustrating a fifth graph for use in describing one or more illustrative embodiments of the present invention.
Figure 10:
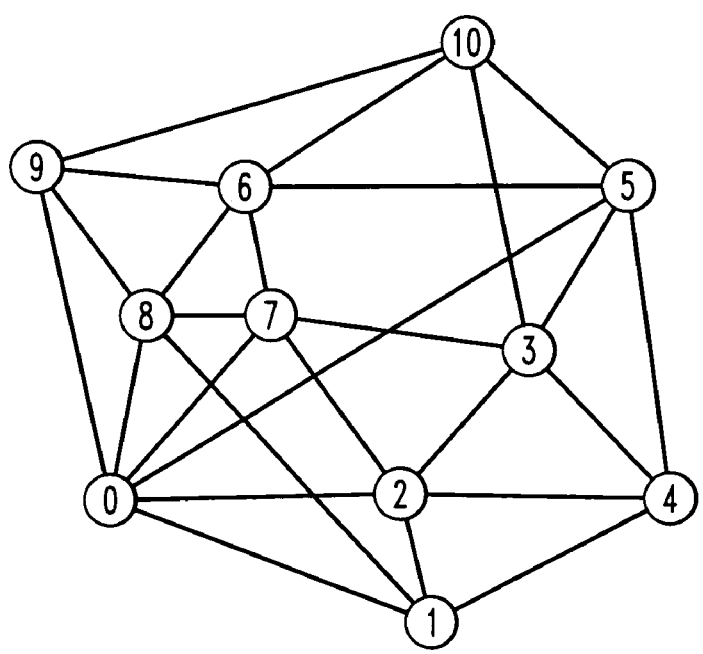
FIG. 10 is a diagram illustrating a sixth graph for use in describing one or more illustrative embodiments of the present invention.

To measure the performance of the inventive algorithms, we did extensive simulations using various real and simulated networks. Here we present the results for four standard networks. However, the presented results are typical of all our simulations. The results are presented for ARPANET (FIG. 7), NJ LATA (FIG. 8), National (FIG. 9) and the European Cost239 (FIG. 10) networks. We ran our algorithms on these networks, both with uniform link capacities and with randomly chosen non-uniform link capacities. In the non-uniform case the link capacities range from 20 to 40. We use, as a benchmark, the solution to a linear program that models our problem without the constraint on the number of bypass tunnels or their minimum bandwidth requirement. Note that, since the linear program models a problem with fewer constraints, its optimal solution is a lower bound on the optimal solution to our problem. Our main observations are summarized in Table I of FIG. 11.

Figure 8:
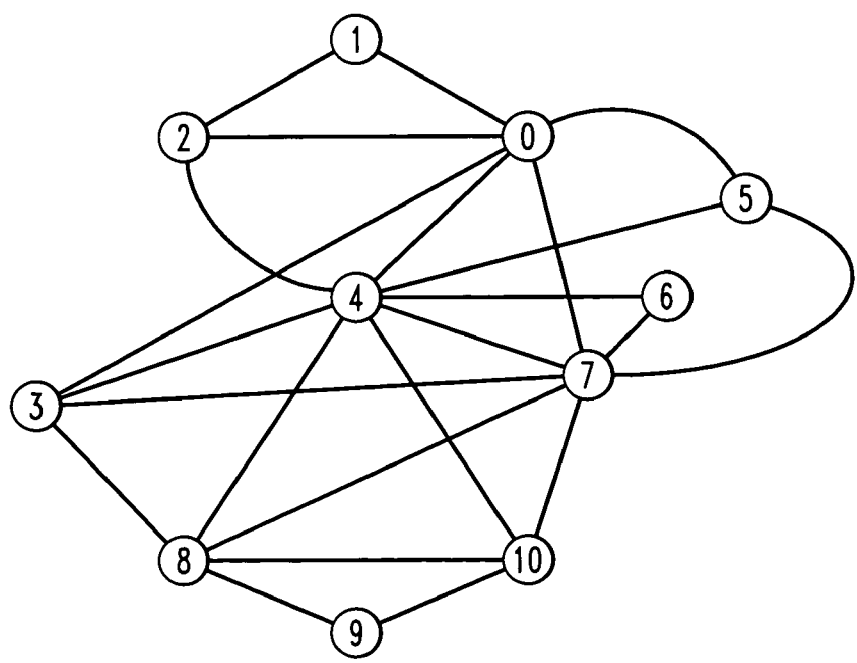
FIG. 8 is a diagram illustrating a fourth graph for use in describing one or more illustrative embodiments of the present invention.

As an example, we describe these results, for the NJ LATA network (FIG. 8). This network has 11 nodes (column II of Table I) and 23 links (column III of Table I). For the uniform link capacity case, we normalize the results so that each links capacity is exactly one unit. In this case the LP (a lower bound on the optimal solution) reserves 6 (column VII of Table I) out of the 23 units of total link capacity for protection. The algorithm based on 2-edge connected subgraph, when optimized with the DFS tree approach, finds an optimal solution of total protection capacity 6 (column VI of Table I) units, which is 26% of the total link capacity. Recall, that any ring based approach (e.g. SONET) would reserve at least 50% of the capacity for protection. The other non-optimized algorithm based on 2-edge connected subgraph also obtains an optimal solution (column V of Table I).

The tree algorithm reserves 10 (column IV of Table I) units of protection capacity (43.5% of the total link capacity and at most 1.67 times the amount reserved by the optimal solution). For non-uniform capacities, the optimal solution reserves at least 188 (column XI of Table I) out of a total 610 (column VIII of Table I) units of capacity for protection. The algorithm based on 2-edge connected graph, finds a solution which reserves 236 (column X of Table I) units of protection capacity (which is at most 1.26 times the optimal solution). For the tree based algorithm, this number is 306 (column IX of Table I), which is at most 1.63 times the optimal solution.

In summary, for the uniform capacity case, the optimized 2-edge algorithm has solution comparable to the optimal algorithm. The 2-edge algorithm, in general, finds a solution, which is at most 1.5 times the optimal solution. The tree based algorithm, finds a solution which ranges approximately between 1.6 to 1.9 times the optimal solution.

VI. Illustrative Extensions

So far, we have presented the invention, for the basic version of the problem, where we want to protect against a single link failure and the links are bidirectional and symmetric in both direction. However, the invention also extends to the case where we want to protect against multiple failures, and when the links are unidirectional. The two algorithms for dealing with t>1 link failures work very much the same way as the algorithm for the single link failure, except it computes t different graphs $T_1, T_2, \ldots T_t$ ($F_1, F_2, \ldots F_t$), instead of just a single graph T (F), such that no pair of graphs $T_i$ and $T_j$ ($F_i$ and $F_j$) share any links. Thus a bypass tunnel, computed using one of these graphs, is link disjoint from a bypass tunnel computed using any other graph. The protection capacities and bypass tunnels (there can be 2t of these per link), are determined in very much the same way, as for the single link case. We are able to show that these two algorithms are also 2-approximation for protecting against any t failures, and they compute a solution in which, even after t failures in the network, each links working traffic can be routed on its "surviving" bypass tunnels. If we make the realistic assumption that link failures are spaced apart, so that there is enough time for LSA updates to reach every LSR between link failures, then every LSR is able to locally determine its surviving bypass tunnels without any signaling or routing modifications.

Thus, the scheme can be efficiently implemented in the existing MPLS networks. The unidirectional links are also handled in very much the same way as the bidirectional links. The only modification is that the underlying networks are now a directed graph, instead of an undirected graph. Given the teachings of the invention, one of ordinary skill in the art will appreciate how to implement the invention in accordance with unidirectional link networks.

Note that the illustrative embodiments of the inventive scheme are mainly designed for dealing with link failures. However, node and SRLG (shared risk link group) failures are also a common occurrence, and fast reroute based schemes to protect against these failures are also very appealing. The algorithms of the invention may be extended to node and SRLG failures.

VII. Illustrative Hardware Implementation

Figures 11, 12:
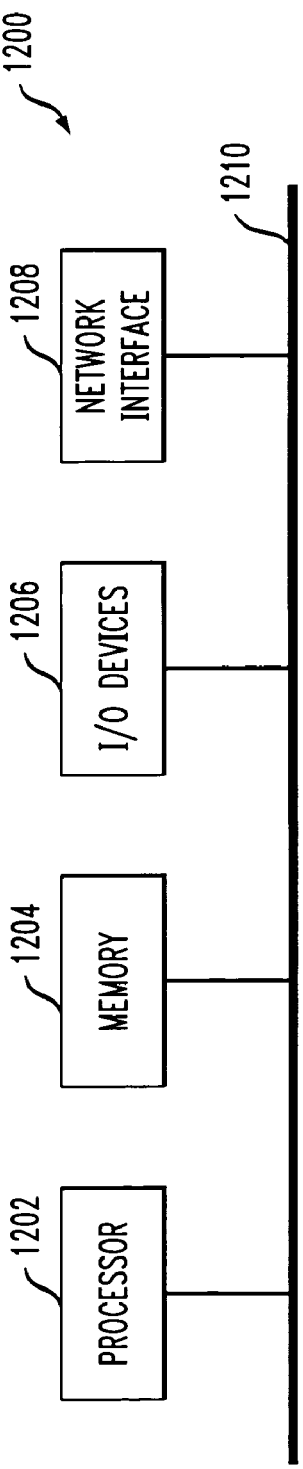
FIG. 11 is a diagram illustrating a table for use in describing one or more illustrative embodiments of the present invention.
FIG. 12 is a diagram illustrating a computer system for implementing a pre-provisioned protection capacity design system according to an embodiment of the present invention.

Referring now to FIG. 12, a block diagram illustrates a generalized hardware architecture of a computer system suitable for implementing a design system for computing pre-provisioned protection capacity, according to an embodiment of the present invention. More particularly, it is to be appreciated that design system 200 in FIG. 2 may implement such a computing system 1200 to perform the algorithms (methodologies) of the invention. Also, one or more system components (e.g., in a network being designed) may implement such a computing system 1200. Of course, it is to be understood that the invention is not limited to any particular computing system implementation.

In this illustrative implementation, a processor 1202 for implementing at least a portion of the algorithms (methodologies) of the invention is operatively coupled to a memory 1204, input/output (I/O) device(s) 1206 and a network interface 1208 via a bus 1210, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide the design inputs used by a design system of the invention to generate design results. Alternatively, the design inputs could be read into the design system from a diskette or from some other source (e.g., another computer system) connected to the computer bus 1210. Also, inputs to the design methodologies may be obtained in accordance with the one or more input devices. The output devices may be one mechanism for a user or other computer system to be presented with results of the design methodologies.

Still further, the phrase "network interface" as used herein is intended to include, for example, one or more devices capable of allowing the computing system 1200 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of design systems, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the algorithms (methodologies) of the invention, as described herein, may be stored in one or more of the associated storage media (e.g., ROM, fixed or removable storage) and, when ready to be utilized, loaded in whole or in part (e.g., into RAM) and executed by the processor 1202.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Accordingly, as described herein, the present invention provides many features and advantages. By way of example, the invention provides for pre-provisioning protection capacity and bypass tunnels in next generation data networks (e.g., MPLS, Optical, ATM, etc.) including dividing the links total capacity into working and protection capacities. The invention also provides for guaranteeing protection for the working traffic against a fixed number of network link failures using only the pre-reserved protection capacity and the bypass tunnels. The invention also provides for protection guarantees independent of the amount or nature of working traffic carried by the network. Also, protection guarantees are provided independent of the routing for the working traffic carried by the network.

Further, the invention provides techniques that can be implemented in existing networks without requiring any significant routing extensions. Also, protection guarantees hold even if all the working traffic of a failed link has to be rerouted as a whole on a single bypass tunnel. Protection guarantees also hold even if all the working traffic of a failed link can be split and re-routed on no more than two bypass tunnels. The invention further provides techniques in which the amount of network overbuild required is no more than two times the overbuild required for any optimal solution that provides the same protection guarantees. Techniques are provided in which the amount of overbuild required is significantly less than what is required for providing the same protection guarantees using existing ring-based (e.g., SONET) schemes.

Still further, the invention does not require the use of computationally expensive solvers of linear programs and hence can be efficiently implemented either in an off-line management server or in the network routers, themselves. An efficient implementation of the invention is provided in the form of a spanning tree based algorithm. An efficient implementation of the invention is provided in the form of a 2-edge connected graph based algorithm. An efficient algorithm for dealing with topology changes is also provided.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of designing a protection capacity to be reserved in a network, the method comprising the steps of:
obtaining one or more link capacities associated with a network topology, wherein the network is assumed to have no pre-existing working traffic; and
determining a capacity partition for at least one link in the network topology, the capacity partition comprising a working capacity portion and a protection capacity portion, the protection capacity portion being reserved for rerouting working traffic upon a failure, the capacity partition determination step further comprising the step of initially generating a spanning tree by considering one or more links of the network topology in decreasing order of link capacity and selectively adding the one or more links to the spanning tree to form an acyclic graph, wherein the capacity partition determination step enables control over the number of backup tunnels associated with the at least one link, on which working traffic can be rerouted, and further wherein the capacity partition determination step provides for a link based local failure restoration and a minimal protection capacity reserved in the network.

2. The method of claim 1, wherein a minimal protection capacity comprises a protection capacity equivalent to no more than two times a protection capacity required for an optimal solution.

3. The method of claim 1, wherein the capacity partition determination step further provides for a link based local failure restoration and a minimal protection capacity when working traffic of the at least one link has to be rerouted on a single bypass tunnel.

4. The method of claim 1, wherein the capacity partition determination step further provides for a link based local failure restoration and a minimal protection capacity when working traffic of the at least one link can be split and rerouted on no more than two bypass tunnels.

5. The method of claim 1, wherein the capacity partition determination step further provides for a link based local failure restoration and a minimal protection capacity independent of at least one of a nature of the working traffic and a routing associated with the working traffic.

6. The method of claim 1, wherein the capacity partition determination step further comprises determining the capacity partition in accordance with a spanning tree based methodology.

7. The method of claim 1, wherein the capacity partition determination step further comprises determining the capacity partition in accordance with a 2-edge connected graph based methodology.

8. The method of claim 1, wherein the network topology comprises an optical network topology.

9. The method of claim 1, wherein the network topology comprises a multi-protocol label switching network topology.

10. The method of claim 1, wherein the network topology comprises an asynchronous transfer mode network topology.

11. Apparatus for designing a protection capacity to be reserved in a network, comprising:
a memory; and
at least one processor coupled to the memory and operative to: (i) obtain one or more link capacities associated with a network topology, wherein the network is assumed to have no pre-existing working traffic; and (ii) determine a capacity partition for at least one link in the network topology, the capacity partition comprising a working capacity portion and a protection capacity portion, the protection capacity portion being reserved for rerouting working traffic upon a failure, the capacity partition determination operation further comprising initially generating a spanning tree by considering one or more links of the network topology in decreasing order of link capacity and selectively adding the one or more links to the spanning tree to form an acyclic graph, wherein the capacity partition determination operation enables control over the number of backup tunnels associated with the at least one link, on which working traffic can be rerouted, and further wherein the capacity partition determination operation provides for a link based local failure restoration and a minimal protection capacity reserved in the network.

12. The apparatus of claim 11, wherein a minimal protection capacity comprises a protection capacity equivalent to no more than two times a protection capacity required for an optimal solution.

13. The apparatus of claim 11, wherein the capacity partition determination operation further provides for a link based local failure restoration and a minimal protection capacity when working traffic of the at least one link has to be rerouted on a single bypass tunnel.

14. The apparatus of claim 11, wherein the capacity partition determination operation further provides for a link based local failure restoration and a minimal protection capacity when working traffic of the at least one link can be split and rerouted on no more than two bypass tunnels.

15. The apparatus of claim 11, wherein the capacity partition determination operation further provides for a link based local failure restoration and a minimal protection capacity independent of at least one of a nature of the working traffic and a routing associated with the working traffic.

16. The apparatus of claim 11, wherein the capacity partition determination operation further comprises determining the capacity partition in accordance with a spanning tree based methodology.

17. The apparatus of claim 11, wherein the capacity partition determination operation further comprises determining the capacity partition in accordance with a 2-edge connected graph based methodology.

18. The apparatus of claim 11, wherein the network topology comprises an optical network topology.

19. The apparatus of claim 11, wherein the network topology comprises a multi-protocol label switching network topology.

20. The apparatus of claim 11, wherein the network topology comprises an asynchronous transfer mode network topology.

21. An article of manufacture for designing a protection capacity to be reserved in a network, comprising a computer readable storage medium containing one or more programs which when executed implement the steps of:

obtaining one or more link capacities associated with a network topology, wherein the network is assumed to have no pre-existing working traffic;

determining a capacity partition for at least one link in the network topology, the capacity partition comprising a working capacity portion and a protection capacity portion, the protection capacity portion being reserved for rerouting working traffic upon a failure, the capacity partition determination step further comprising the step of initially generating a spanning tree by considering one or more links of the network topology in decreasing order of link capacity and selectively adding the one or more links to the spanning tree to form an acyclic graph, wherein the capacity partition determination step enables control over the number of backup tunnels associated with the at least one link, on which working traffic can be rerouted, and further wherein the capacity partition determination step provides for a link based local failure restoration and a minimal protection capacity.

22. The method of claim 7, wherein the 2-edge connected graph based methodology considers adding links to the spanning tree created by a spanning tree based methodology.

23. The method of claim 1, wherein the capacity partition determination step further comprises adapting the capacity partition in response to a change in the network topology, wherein the change in the network topology comprises at least one of an addition of a link and a deletion of a link.

* * * * *

UNITED STATES PATENT AND TRADEMARK OFFICE
CERTIFICATE OF CORRECTION

| | | |
|---|---|---|
| PATENT NO. | : 7,609,624 B2 | Page 1 of 1 |
| APPLICATION NO. | : 10/838098 | |
| DATED | : October 27, 2009 | |
| INVENTOR(S) | : Alicherry et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 972 days.

Signed and Sealed this

Twelfth Day of October, 2010

David J. Kappos
*Director of the United States Patent and Trademark Office*